Oct. 18, 1966  G. NATTA ETAL  3,280,087
OPTICALLY ACTIVE POLYMERS AND PROCESS FOR OBTAINING THE SAME
Filed Nov. 28, 1961  4 Sheets-Sheet 1

3,280,087
OPTICALLY ACTIVE POLYMERS AND PROCESS FOR OBTAINING THE SAME

Giulio Natta, Mario Farina, Mario Donati, and Giancarlo Bressan, all of Milan, Italy, assignors to Montecatini Societa Generale per l'Industria Mineraria e Chimica, Milan, Italy
Filed Nov. 28, 1961, Ser. No. 155,267
Claims priority, application Italy, Nov. 30, 1960, 20,604/60
13 Claims. (Cl. 260—88.5)

The present invention relates to optically active polymers and to a process for obtaining these polymers.

Some examples of known optically active synthetic polymers obtained from unsaturated monomers are (a) polymers which contain asymmetric carbon atoms only in the side chain substituents and (b) copolymers in which the optical activity, derived from the asymmetric configuration of the tetrahedral main chain carbon atoms, overlaps that caused by asymmetric side substituents, such as, e.g., in the case of copolymers of maleic anhydride with methacrylic acid esters of optically active alcohols (Beredjick and Schuerch, J. Am. Chem. Soc. 78, 2646 (1956), 80, 1933 (1958).

The increase of the rotary power which occurs in some polymers of type (a) such as, e.g., polyalphaolefins with an asymmetric carbon atom in the side substituent, is not caused by an effective asymmetric configuration of the main chain carbon atoms but only by rotational contributions due to the spiralization of the macromolecules in a preferential direction depending on the type of substituent and configuration.

Applicants have now surprisingly found, that homopolymers possessing an optical activity can be obtained by polymerizing, in the presence of suitable catalysts, monomers having a completely symmetrical structure, i.e., monomers which, before the polymerization, do not possess any asymmetric carbon atoms. The asymmetric carbon atoms being formed only during the polymerization by opening of the π-bond and successive passage of the atom from a planar to a tetrahedral configuration.

Due to this characteristic, the polymers of the present invention are different not only from the aforementioned optically active polymers of type (a) and (b) but also from the polymers of the polypropylene oxide type, which possess asymmetries in the chain, which asymmetries, however, pre-existed in the monomer.

An object of the present invention is therefore polymers having optical activity from monomers not possessing asymmetric carbon atoms.

A further object of the invention is to provide a process for producing these optically active polymers utilizing catalysts which promote the formation of these polymers.

Other objects and advantages of the present invention will be apparent as the description proceeds.

As the unsaturated monomers which do not contain asymmetric carbon atoms but which do form asymmetric carbon atoms during the polymerization according to the present invention, there may be mentioned for example:

(1) Symmetrical unsaturated cyclic compounds capable of polymerizing in the threo-diisotactic form (see FIGURE 1, which illustrates Fisher projections (aI) and (bI) of enantiomorphous structures and zig-zag planar representation thereof (aII) and (bII); as illustrative but not limiting examples, we may mention: cyclopentene, cyclohexene, etc., heterocyclic oxygen compounds such as paradioxene, dioxadiene, 2,5-dihydrofurane and the analogous heterocyclic nitrogen and sulfur compounds.

(2) Unsaturated cyclic compounds wherein at least one of the substituents of one of the carbon atoms bound with a double bond is different from both the substituents of the other carbon atom and which compounds can polymerize either in the threo-di-isotactic form (FIGURE 2 (a) and (b)) or in the erithro-di-isotactic form (FIGURE 2, (c) and (d)).

By way of illustration, there may be mentioned furane when it is polymerized in 2,3-; 4,5-dihydrofurane; 5,6-dihydropyrane and their derivatives wherein one or more hydrogen atoms of the ring are substituted by other types of atoms or groups, e.g., benzofurane (coumarone), 1-methyl-4,5-dihydrofurane, 5,5'-dimethyl-4,5-dihydrofurane and the corresponding heterocyclic sulfur and nitrogen compounds. Variously substituted cyclic olefins mentioned above in 1 and/or 2, such as 1-methoxycyclohexene and its homologues also fall within this group. The structures of these last examples are not represented in the FIGURES 1–5.

(3) Compounds of the general formula

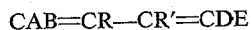

wherein A, B, D, E, R and R' each represents hydrogen, a halogen, an alkyl, aryl, cycloalkyl, alkoxy, thiol, esterified hydroxyl, hydroxyl, aldehyde, ketonic, carboxylic, substituted carboxylic (i.e., esters, amides or salts), a substituted or unsubstituted amino group, and —CN, —CH$_2$—NH$_2$, —CH$_2$OH groups, esterified or unesterified, wherein A is different from B and which compounds polymerize with 1,4-enchainment.

This class comprises:

(a) All 1-monosubstituted butadienes, such as for instance, 1-methyl-butadiene and its homologues, vinylacrylic acid and its derivatives (esters, salts, amides, substituted amides, nitriles (etc.), 1-alkoxy butadienes (1-tert.butoxy butadiene 1-cumyloxy butadiene, etc.), 1-acetoxy butadiene and its homologues, 1-halo-butadienes, etc.

(b) All the 1,4-disubstituted butadienes with equal substituent groups such as for example, 1,4-dimethyl butadiene, 1,4-diphenyl butadiene, 1,4-dicarboxy butadiene and its derivatives, etc.

(c) All the 1,4-disubstituted butadienes with different groups such as for example, 1-phenyl-4-methyl-butadiene, sorbic acid (4-methyl-1-carboxy butadiene) its esters, salts or other derivatives (such as, amides, substituted amides, nitriles, etc.), sorbic alcohol and the corresponding ethers and amines, β-styrylacrylic acid (4-phenyl-1-carboxy butadiene) its esters and sorbic aldehyde, 1-aceto-4 methyl butadiene, β-styrylacrylic aldehyde, 1-methyl-4-methoxy-butadiene, etc.

(d) All the tri-, tetra,- etc. substituted butadienes such as for example, 4,4'-dimethyl-1-carboxybutadiene, 4-phenyl - 1 - methyl-1-carboxybutadiene, 1,4-dimethyl-1-carboxybutadiene, 2,4,4'-trimethyl-1-carboxy-butadiene, 4-phenyl-2,3-dimethylcarboxy-butadiene and their derivatives (esters, salts, amides, nitriles, alcohols, amines, etc.).

Among the above compounds, of interest are monomers such as benzofurane and monomers having the general formula:

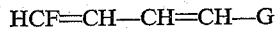

wherein F is a member selected from the group consisting of hydrogen, phenyl, and alkyl having 1 to 4 carbon atoms; G is selected from the group consisting of hydrogen, COOH, COOCH$_3$ and COOC$_4$H$_9$, with the proviso that F and G are not both hydrogen.

In the case where a compound of the general formula CAR=CR—CR=CR₂, wherein A and R have the meaning given above (more particularly, 1-mono-substituted butadienes), is employed as a monomer, the asymmetric structure is of the isotactic type (FIGURE 3).

In the case where compounds of the formula

CAR=CR—CR=CAR wherein A and R have the above meaning (more particularly, symmetric 1,3-disubstituted butadienes), are used, the asymmetric structure is of the threo-di-isotactic type (FIGURE 4).

By contrast, in cases where non-centro symmetric monomeric units are used (FIGURE 5), both the threo-di-isotactic and the erithro-di-isotactic structure are optically active.

FIGURE 1 represents enantiomorphs of a polymer in a Fisher projection (aI and bI) and in a zigzag projection (aII and bII) possessing a threo-di-isotactic structure.

FIGURE 2 shows enantiomorphs of a polymer in a Fisher projection (aI and bI) and a zigzag projection (aII and bII) possessing a threo-di-isotactic structure, and the Fisher projections (cI and dI) and the zigzag projections (cII and dII) of a polymer possessing an erithro-di-isotactic structure.

FIGURE 3 shows an isotactic structure of a mono-substituted butadiene in a zigzag projection.

FIGURE 4 shows enantiomorphs of a di-substituted butadiene possessing a threo-di-isotactic structure.

FIGURE 5 represents the threo-di-isotactic structure of enantiomorphs ((a) and (b)) and the erithro-di-isotactic structure of enantiomorphs ((c and (d)).

Figure 1:
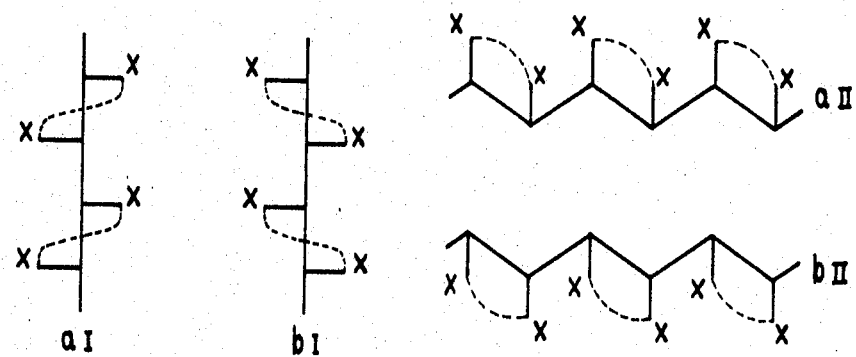
FIGURES 1–5, show the structure of the polymers drawn as a zigzag representation of the main polymer chain and/or in a Fisher projection.
Figure 2:
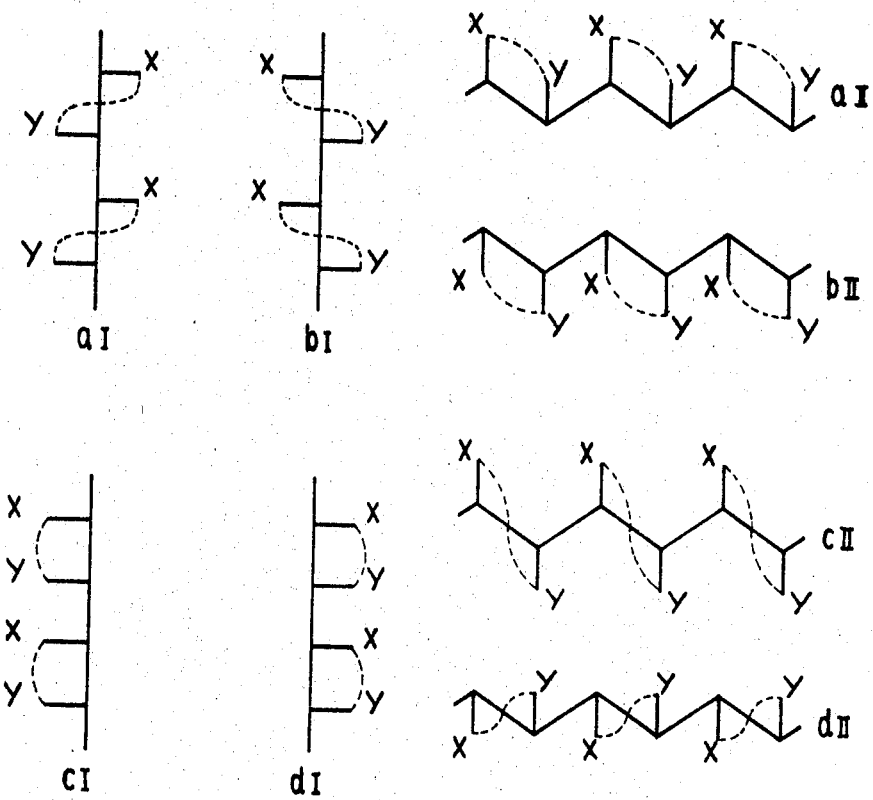
Figure 3:
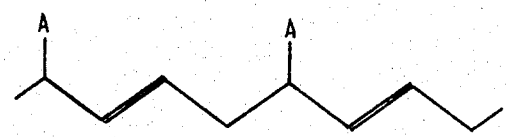
Figure 3:
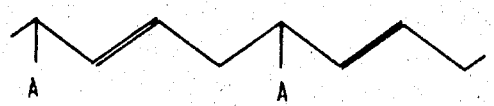
Figure 4:
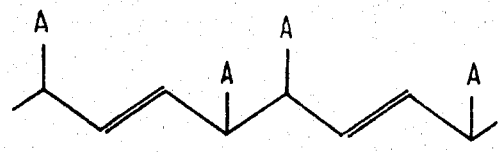
Figure 4:
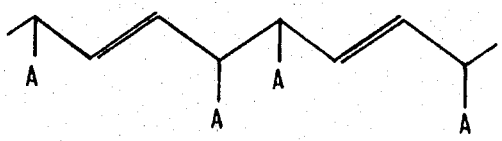
Figure 5:
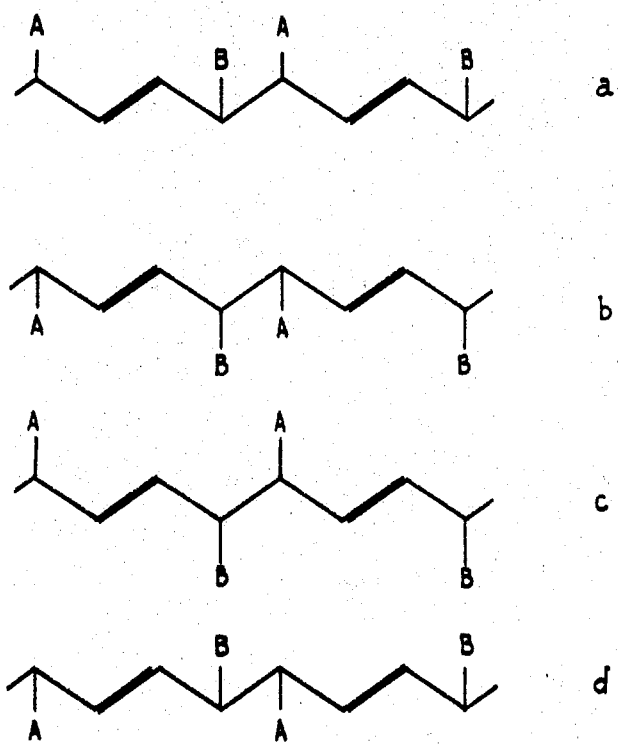

The double bond in FIGURES 3–5, for the sake of simplicity, is drawn only in trans form, but the symmetry characteristics of the structures do not vary even if the double bonds present a cis-configuration.

In addition, applicants have found, that, upon stereo-specific polymerization with applicants' asymmetric catalysts, certain alkyl esters of trans-trans sorbic acid (which do not contain asymmetric carbon atoms) yield optically active polymers.

It has also been found by the applicants that, by polymerizing these last-mentioned monomers, polymers having tri-tactic structure are obtained, characterized by the presence in the main chain of two asymmetric carbon atoms and of a double bond of the trans type.

The structure of these products is of the "erithro" type since such a structure better agrees with the chain form determined by X-ray examination and with the rule of the "minimum size" of the side substituents.

The probable structure of poly-trans-trans sorbates is therefore represented in FIGURES 5(c) and (d).

Optically active polymers are also obtained by polymerizing, in the presence of asymmetric catalysts, monomers such as 1-monosubstituted butadienes, such as a methyl ester of β-vinyl-acrylic acid (pentadienoic or butadiene-carboxylic acid) and pentadiene (1-methyl-butadiene). An iso-trans-tactic structure has been recognized in these polymers, i.e., a structure in which the residual double bond of each monomeric unit is in the trans configuration and the substituent in position 1, at least for long chain portions, has the same absolute steric position (d or l).

The polymers derived from benzofurane, i.e., a cyclic unsaturated compound belonging to the aforementioned class 2, are also found to be especially optically active.

The high optical activity observed (higher than 20–30°) must be due to a di-isotactic structure since a structure of syndiotactic type in the case of head-to-tail polymers would lead to inactive products.

Therefore, a further object of the present invention is to provide a process for polymerizing monomers of the aforementioned classes (1, 2 and 3) not containing any asymmetric carbon atoms, in the presence of an asymmetric catalyst capable of promoting the formation of only one of the two antipodal chains, to homopolymers having optical activity.

The catalysts which, according to the present invention are suitable for polymerizing the aforementioned monomers to optically active polymers, must therefore not only promote the polymerization of the respective monomers, but also be able to promote, in a partial or total manner, the growth of only one type of macromolecules (of the l or d type).

As the "asymmetric catalysts" employed according to the present invention, there can be used catalytic systems consisting of or comprising the following compounds:

(a) Optically active organometallic compounds of metals belonging to the 1st, 2nd or 3rd groups of the Periodic Table according to Mendeleef, in which at least one of the organic radicals is asymmetric. Among the compounds of metals belonging to the 1st group of the Periodic Table, organic lithium compounds, such as, for example, lithium isoamyl (obtained from (+)2-methyl-1-chlorobutane) in which the symmetric carbon atom is bound to the metal by a —CH₂— group, and menthyl lithium (obtained from (−) menthyl chloride) in which there is a direct lithium-asymmetric carbon bond, are found to be particularly suitable. Among the organic compounds of metals belonging to the 2nd or 3rd group of the Periodic Table, these particularly suitable are the derivatives of beryllium, aluminum or magnesium, either completely alkylated or alkylhalides or alkyl-alkoxides thereof, wherein at least one of the alkyls is asymmetric.

(b) Metal alkoxides (chloroalkoxides or alkylalkoxides) of optically active alcohols, such as tetraisoamyl, tetraisobornyl or tetramenthyl titanate, diisoamyloxy titanium dichloride, triisoamyloxy-aluminum, diisobornyl-oxyisopropyloxy aluminum, etc.

(c) Compounds in which the metal atom is bound to the asymmetric organic group by a nitrogen atom, more particularly the compounds of the general formula $Me^I{}_pMe^{II}N(R_1R_2)_mx_n$ wherein $R_1$ and $R_2$ are different alkyl, cycloalkyl, aryl or aralkyl groups, $R_1$ or $R_2$ being an asymmetric radical, $Me^I$ is an alkali metal, $Me^{II}$ is a metal belonging to the 1st, 2nd or 3rd group of the Mendeleef Periodic Table, X is hydrogen or a halogen, $p$ is a whole number or zero and $m+n$ corresponds to the sum of the valences of $Me^I$ and $Me^{II}$.

(d) The products obtained by complexing one or more molecules of a compound usually employed as catalyst for polymerizing the respective monomer, with one or more molecules of an asymmetric complexing agent.

As examples of products of this type there can be mentioned:

Etherates of boron fluoride or of aluminum alkyls with optically active ethers (e.g., $BF_3$, $Al(C_2H_5)_3$ or $Al(C_2H_5)_2Cl$ etherates with methyl isoamyl ether or with ethyl menthyl ether);

The complexes of aluminum alkyls or alkyl aluminum halides with optically active tetrasubstituted ammonium salts of the formula, $R'R''R^{III}R^{IV}NY$ where $R'$, $R''$, $R^{III}$ and $R^{IV}$ are alkyl or aryl radicals and Y is a halogen or an anion different from the halogen. The optical activity of these ammonium compounds is due to the presence of one or more asymmetric R substituents, to the asymmetry of N and/or to the asymmetry of Y (e.g., when Y is the camphersulfonic anion);

The lithium alkyl complex compounds with optically active basic compounds according to the Lewis theory of acids and bases (ethers, amines, a.s.o.) such as n-butyl lithium and (−) menthyl ethyl ether or (+) iso-amyl-ethyl ether, are also particularly suitable as catalysts.

In some cases an excess of complexing agent can also be used thus causing it to act as an asymmetric solvent.

(e) The products obtained by reacting one or more molecules of a compound usually employed as catalyst for the polymerization of the respective monomer, with optically active organic compounds containing functional groups which are reactive with respect to the catalytic compound.

Examples of catalytic systems of this type are products of the reaction between metallorganic compounds (e.g., lithium alkyls, aluminum trialkyls, dialkyl aluminum monohalides, alkyl aluminum dihalides, etc.) or inorganic compounds (e.g., aluminum trichloride, tribromide or triiodide, boron trifluoride, etc.) and compounds containing active hydrogen and/or functional groups containing multiple bonds between a carbon atom and heteroatoms (e.g., O, S, N, P, etc.) or between heteroatoms themselves. Among the classes of compounds of this type are: alcohols, acids, oxyacids, aminoacids, ketoacids, sulfonic acids, sugars or natural substances of a more complex nature, containing oxygen, nitrogen or sulfur, such as certain alkaloids, vitamins, terpenic compounds or derivatives thereof.

As illustrative and not limiting, some compounds belonging to the preceding classes, which can be used according to the present invention, are compounds such as isoamyl alcohol, menthol, borneol, isoborneol, isovalerianic acid, camphoric acid, menthancarboxylic acid, alanine, $\beta$-phenyl-alanine, glutammic acid, cysteine, glycose, lactose, arabinose, camphorsulfonic acid, brucine, strychnine, cinchonine, ascorbic acid, camphor, etc.

The catalysts of the above types (a), (b), (c), (d) and (e), if desired, an also be used together with other compounds such as transition metal halides belonging to the 4th, 5th, 6th or 8th groups of the Mendeleef Periodic Table, possibly in the form of complexes with ethers or organic bases.

(f) Complexes isolated in the optically active form, e.g., poly-dentates of chromium, iron, cobalt, etc. (e.g., chromium triacetyl-acetonate) from which the optical antipodes can be separated by chromatography or by chemical means.

(g) Hemihedral crystalline forms of metal compounds possessing an asymmetry in the solid state (e.g., chromium chloride has a structure such that there can be foreseen for it the presence of $l$-crystals and $d$-crystals). The selection of crystals all possessing the same sign makes it possible to obtain the desired effect.

(h) Symmetric compounds, capable of promoting the polymerization of the respective monomers, adsorbed on an optically active support (e.g., quartz), which support causes an asymmetric induction, are also suitable catalysts according to the present invention.

The process of the invention is preferably carried out between $-120$ and $+150°$ C., more often between $-100$ and $+20°$ C.

The following examples are given to illustrate some aspects of the present invention. The rotary power of the solutions of the polymers produced are determined unless otherwise indicated, in sodium light (589 m$\mu$) in which light the rotation is notoriously low.

Under these conditions, however, and with 1–2% solutions there are obtained values between 0.1° and 3°, which certainly exceed any possible reading mistakes ($\pm 0.01°$). The rotary power of the polymers was observed in suitable solvents, e.g., poly-methylsorbate, poly-methyl-vinylacrylate and poly-alkyl-$\beta$-styrylacrylate in CHCl$_3$; poly-butylsorbate in CHCl$_3$ or in toluene; poly-sorbic acid in methanol, alkaline salts of poly-sorbic acid in water; poly-benzofurane in benzene, toluene or dioxane and polypentadiene in CCl$_4$.

A remarkable increase in the optical activity is noted if the polymer solutions are observed in a spectrum-polarimeter using higher frequencies and, more particularly, if compatible with the transparency of the solutions, using ultra-violet light. For example, a poly-methyl sorbate, which at 589 m$\mu$ (D line of sodium), presents a molecular rotation [M] of $-3.9°$ (calculated on the weight of the monomeric unit) presents the following molecular rotations:

$$[M]_{500}=-4.3; \ [M]_{450}=-6.4; \ [M]_{400}=-10.0;$$
$$[M]_{375}=-13.5; \ [M]_{350}=-17.0$$

Even more outstanding in the increase obtained in the case of poly-benzofurane. The molecular rotary power of this polymer reaches at 303 m$\mu$ the value of $-800°$ C.

The data reported herein are of such values that they are not due only to the action of the terminal groups.

A comparison with similar low molecular weight compounds shows that as in the case of polysorbate, the observed optical activity is of the same order. Thus, the polymer of 3-methyl-pentanoic acid ethyl ester has a $[M]_D$ of $-6.7$ and the 2,3-dimethyl pentanoic acid ethyl ester polymer (mixture of the two diasteroisomers having (S)-configuration in 3) has a $[M]_D$ of $+2.9$.

Oxidative degradation of these polymers confirms that the optical activity is attributable to the configuration of the asymmetric carbon atoms in the chain.

In the case of polymers such as substituted poly-butadienes, the increase in the optical activity cannot be attributed to chain spiralization such as that observed in the case of polyolefins, since the polymer chain itself is in this instance centro-symmetric.

By contrast, in the case of polybenzofurane it should be remembered that stereoregular polymers of the diisotactic type heretofore known and obtained by the polymerization of non-cyclic alkenyl ethers or of $\beta$-chloro-vinyl ethers, possess in the main chain a spiral-like conformation when in the solid crystalline state. It is known that in the polymers obtained from optically active non-cyclic monomers, the presence of an asymmetric group in the side chain induces a preferential spiralization in the main chain. There is therefore a considerable increase in the rotational power of these polymers with respect to the rotational power observed in low molecular weight compounds of a similar structure. The optical activity caused by the directional spiralization induced by the side substituent, however, is a property which in time tends to disappear when the symmetric side substituent is eliminated. Moreover, this optical activity decreases upon passing the polymer from the solid to the molten state or also upon increasing the temperature.

In the polymers of benzofurane obtained by opening the ethylenic double bond of the furanic ring, there are two asymmetric carbon atoms in the chain per each monomeric unit (i.e., each carbon atom in the main chain is asymmetric). For this reason the directional spiralization in this case is necessarily determined by the configuration of the asymmetric carbon atoms in the main chain, which cause the increase in the optical activity. The coefficient of temperature of the $[\alpha]_D$ for this polymer appears to be slightly positive, thus confirming the stability of the polymer configuration.

The following examples are only given for the purpose of illustration. Only some of the possible asymmetric polymer syntheses are shown in the examples, but it is to be understood that the present invention encompasses the production of numerous other asymmetric polymers as disclosed in the instant application.

*Example 1*

5.5 g. of methyl sorbate (methyl ester of trans-trans sorbic acid) are added, while in toluene under nitrogen at $-70°$ C., to a toluene solution of 5 millimols of isoamyl lithium (obtained from 2-methyl-1-chlorobutane having $[\alpha]_D=+1.61$ without solvent and metallic lithium in petroleum ether). The mixture is kept at $-30°$ C. for 20 hours. The resulting polymer is coagulated with methanol and extracted (4.0 g.) with boiling acetone in a Kamagawa extractor.

1.4 g. of such polymer having an intrinsic viscosity (determined in tetrahydronaphthalene at 135° C.) of 0.55×100 cm.³/g., are dissolved in 50 cm.³ of chloroform and observed in a Schmidt-Haensch polarimeter (type 14160) (reading precision ±0.005) while in a 40 cm. tube using sodium light (5890A.). A rotation of −0.31°, corresponding to $[\alpha]_D = -2.8$, $[M]_D = -3.5$, is read.

The whole polymer is dissolved in $CHCl_3$ and is precipitated in dilute solution with methanol. After standing at about 50° C. for 2 hours, the polymer is filtered. The optical activity is the following:

$$[\alpha]_D = -3.1; [M]_D = -3.9$$

The acetone extract (0.2 g.), after purification from the catalyst residues, presents an $[\alpha]_D = -1.5$.

Example 2

By operating as in Example 1, but using 4.0 g. of methyl sorbate and 6 millimols of isoamyl lithium while operating at −40° C. for 40 hours, 1.55 g. of polymer are obtained.

After 3 dissolutions in $CHCl_3$ and reprecipitations with methanol, the polymer presents an $[\alpha]_D = -7.95$ (in $CHCl_3$) and $[M]_D = -10.0$.

Example 3

9.5 g. of methyl sorbate are polymerized in the manner of Example 1, using 7 cm.³ of a solution containing menthyl lithium. The catalyst is obtained by reacting finely pulverized lithium with (−) menthyl chloride (having $[\alpha]_D = -45.5$ without solvent) and formed by reacting of (−) menthol with HCl in the presence of $ZnCl_2$, 1.3 g. of polymer having $[\eta] = 0.5$, $[\alpha]_D = +1.0$ and $[M]_D = +1.2$, (in $CHCl_3$) are thereby obtained.

Example 4

By operating in the manner of Example 1, but employing 4.7 g. of butyl sorbate (n-butyl ester of trans-trans sorbic acid) and isoamyl lithium and mixing the solutions at −40° C. while maintaining the resulting mixture at −30° C. for 20 hours, 2.6 g. of polymer having $[\alpha]_D = +3.2$ and $[M]_D = +5.4$ (in $CHCl_3$), are obtained.

Example 5

3 millimols of optically active isoamyl lithium are added at −70° C. to a solution of 3 g. of butyl β-styrylacrylate in 20 cm.³ of anhydrous toluene. The mixture is kept at −40° C. for 40 hours and the polymer is then coagulated with methanol, 1.2 g. of polymer are obtained.

The polymer, dissolved in $CHCl_3$, possesses an $[\alpha]_D = +2.0$ and $[M]_D = +4.6$.

Example 6

3 g. of methyl β-styrylacrylate are polymerized in a similar manner in the presence of 3 millimols of isoamyl lithium at −50° C. After 70 hours, 0.1 g. of polymer having an $[\alpha]_D = -1.2$ and $[M]_D = -2.2$ (in $CHCl_3$) are obtained.

Example 7

0.7 g. of optically active poly-methyl sorbate, obtained according to Example 2, are saponified in a 10% KOH solution in methanol for 2 hours on a water bath. The insoluble product is washed with methanol and the residue is dissolved in water. The solution is acidified in the warm to a pH of 4 to 5.

The precipitated acid polymer, after drying, is dissolved in menthanol. It possesses an $$[\alpha]_D = -3.3 \text{ and } [M]_D = -3.7$$

Example 8

3 g. of methyl sorbate are polymerized at −60° C. in toluene in the presence of a catalyst preformed at room temperature from 1.3 mols of butyl lithium and 1.3 mols of (−) menthyl ethyl ether (having an $[\alpha]_D = -97$ (pure)). After 48 hours, 0.8 g. of polymer having $[\alpha]_D = +6.1$ (in $CHCl_3$) and $[M]_D = +7.7$, are obtained.

Example 9

3 g. of butyl sorbate are polymerized in the same manner as Example 8, at −40° C. for 16 hours. 0.55 g. of polymer having $[\alpha]_D = +5.3$ and $[M]_D = +8.9$, are obtained.

Example 10

3 g. of butyl sorbate are polymerized in the same manner as Example 8, in the presence of 1.5 millimols of butyl lithium and 3 millimols of (−) menthyl ethyl ether. 0.3 g. of polymer having $[\alpha]_D = +8.9$ and $[M]_D = +14.1$ (in $CHCl_3$) are obtained.

Example 11

9 g. of methyl β-styrylacrylate are polymerized in the same manner as Example 8 in the presence of 14 cc. of butyl lithium and 2 cm.³ of (−) menthyl ethyl ether in 90 cm.³ of toluene, at −50° C. After 90 hours, 5 g. of polymer having an $[\alpha]_D = +4.35$ and $[M]_D = +8.2$, are obtained.

Example 12

3 g. of butyl β-styrylacrylate are polymerized as described in the preceding example. 1.2 g. of polymer having an $[\alpha]_D = +3.7$ and $[M]_D = +8.5$, are obtained.

Example 13

3.0 g. of methyl β-vinylacrylate are polymerized as described in the preceding example at −50° C. for 20 minutes. 2.2 g. of polymer having an $[\alpha]_D = +7.2$ and $[M]_D = +8.1$, are obtained.

Example 14

0.15 cm.³ of $AlCl_2C_2H_5$ are added at room temperature to a suspension of 0.047 g. of (−) β-phenylalanine in 30 cm.³ of toluene. After 15 minutes, the mixture is cooled to −75° C. and 1.95 g. of benzofurane, dissolved in 5 cm.³ of toluene, are gradually added within 5 minutes. After 20 hours, the polymer is coagulated with methanol, filtered and is purified twice by dissolution in benzene and reprecipitation with methanol.

Yield=0.77 g. $\alpha_D = -2.65$ (in 2% benzene solution (1=4)); $[\alpha]_D = -33.1$; $[M]_D = -39.1$.

Example 15

2.1 g. of benzofurane are polymerized, as described in Example 14, in the presence of 0.15 cm.³ of $AlCl_2C_2H_5$ and of 0.052 g. of (+) β-phenylalanine in toluene. 1.1 g. of a polymer having an $[\alpha]_D = +13$ (in a 2.5% benzene solution), are obtained.

Example 16

2.4 g. of benzofurane are polymerized, as described in Example 14, in the presence of 0.13 g. of $AlCl_3$ and 0.16 g. of (−) β-phenyl alanine in toluene. 0.85 g. of polymer having an $[\alpha]_D = -28.5$ (in a 2.1% benzene solution), are obtained.

Example 17

2 g. of benzofurane are polymerized, as described in Example 14, in the presence of 0.1 g. of $AlCl_3$ and 0.07 g. of (+) β-phenyl alanine in toluene. 0.5 g. of polymer having an $[\alpha]_D = +13.5$ (in a 0.3% benzene solution), are obtained.

Example 18

2 g. of benzofurane are polymerized, as described in Example 14, in the presence of 0.12 g. of $AlBr_3$ and 0.07 g. of (+) β-phenyl alanine. 1.2 g. of polymer having an $[\alpha]_D = +11$ (in a 2.8% benzene solution), are obtained.

Example 19

1.95 g. of benzofurane are polymerized, as described in Example 14, in the presence of 0.15 cm.³ of $AlCl_2C_2H_5$ and 0.067 g. of (+) tetramethylammonium camphorsulfonate. 1.5 g. of polymer having an $[\alpha]_D = -2.4$ (in a 4.1% benzene solution) are obtained.

Example 20

3.2 g. of benzofurane are polymerized, as described in Example 14, in the presence of 0.68 cm.³ of AlCl₂C₂H₅ and 0.11 g. of camphorsulfonic acid which is marked in the sulfonic group with $S^{35}$ (and having an activity of 900,000 impulses per minute, determined in a thin-window Geiger-Muller counter). 2.9 g. of polymer are obtained which has the following properties: $\alpha_D = -0.68$ (in a 4.7% CHCl₃ solution (1=4)); $[\alpha]_D = -3.6$;

$$[M]_D = -4.3$$

The polymer does not show radioactivity.

Example 21

3.0 g. of benzofurane are polymerized, as described in Example 14, in the presence of a catalyst prepared at −75° C. from 0.5 cm.³ of AlCl₂C₂H₅ and 0.35 g. of (−) brucine. 1.16 g. of polymer having an $\alpha_D = +0.47$ (in a 4.2% benzene solution (1=4)), are obtained, possessing an $[\alpha]_D = +2.8$ and $[M] = +3.3$.

Example 22

3.1 g. of benzofurane (purified by distillation on LiAlH₄) dissolved in 10 cm.³ of toluene, are added at −75° C. to a toluene solution containing 0.15 cm.³ of AlC₂H₅Cl₂ and 0.09 g. of methyl-butylbenzyl-phenyl-ammonium camphorsulphonate. The latter is obtained by reacting (−) Ag camphorsulphonate with racemic methyl butyl benzyl phenyl ammonium iodide, and is separated into the diastereoisomers by several crystallizations. The polymerization mixture is kept at a temperature of −50° to −30° C. for 24 hours and the polymer is then coagulated with methanol. The polymer is then dissolved in benzene and reprecipitated with methanol. In a 2.9% toluene solution (1-2), the polymer has $\alpha_D = -0.065$; $[\alpha]_D = -1.1$ and $[M]_D = -1.3$.

Example 23

The same procedure is utilized as that of Example 22, but a mixture of 0.15 cm.³ of Al(C₂H₅)Cl₂ and 0.069 g. of (−) methyl butyl benzyl phenyl ammonium iodide is used as the catalyst. A temperature of −75° C. is maintained. 0.24 g. of polymer are obtained. After two precipitations a specific rotation $[\alpha]_D = -0.6$ and $$[M] = -0.7$$

(in C₆H₆) is observed.

Example 24

The procedure is the same as that of Example 22, but as the catalyst the reaction product of BF₃.(C₂H₅)₂O with (−) menthyl ethyl ether is used, after a distillation of the free diethyl ether. 0.016 g. of polymer are obtained with a $[\alpha]_D = -0.5$ and $[M]_D = -0.6$. (in C₆H₆).

Example 25

5 cm.³ of trans pentadiene are polymerized at room temperature in the presence of a catalyst comprising 0.25 g. of VCl₃ and 1 g. of (+) tris-(S)-2-methyl-butyl aluminum etherate in 15 cm.³ of anhydrous heptane. After 55 hours, 1.6 g. of crude polymer are obtained from which upon ether extraction, a residual fraction is obtained which amounts to 1 g. and has $[\alpha]_D = -1.5$ (in a 2.6% CCl₄ solution) and $[\eta] = 0.53 \times 100$ cm.³ g. (in toluene at 30° C.). This polymer, by X-ray examination, appears to be in the smetic form. Upon infrared examination it presents a ratio of 83 between the crystallinity band and the reference band.

The optically active polymers, obtained according to the present invention, are useful in the production of filters, absorbing substances and ion exchanging resins capable of separating optically active substances from racemic solutions.

Moreover, by using said polymers, optical elements such as prisms, lenses, etc. or films possessing particular characteristics due to the rotatory power and said polymer components and suitable for particular uses in the scientific and technical fields, can be obtained.

Many modifications and variations can, of course, be practiced without departing from the scope of the present invention.

Having thus described the present invention, what is desired to secure and claim by Letters Patent is:

1. Linear, polyisotatic optically active homopolymers selected from the group consisting of poly(benzofurane)
    poly(methylsorbate)
    poly(butylsorbate)
    poly(butyl-beta-stryl acrylate)
    poly(methyl-beta-styryl acrylate)
    poly(methyl-beta-vinylacrylate) and
    poly(trans-pentadiene), said homopolymers being characterized by having asymmetric carbon atoms only in the main chain, which asymmetric carbon atoms are formed by opening of the π-bond of the corresponding unsaturated optically inactive monomers during polymerization, with successive passage of the atom from a planar to a tetrahedral configuration, said homopolymers being further characterized in being soluble in at least one solvent selected from the group consisting of chloroform and benzene.

2. Linear, polyisotatic, optically active poly(methylsorbate) according to claim 1, and further characterized in that each of the polymerized methylsorbate units making up the homopolymer contains an ester group.

3. Linear, polyisotatic, optically active poly(butylsorbate) according to claim 1, and further characterized in that each of the polymerized butylsorbate units making up the homopolymer contains an ester group.

4. Poly(benzofurance) according to claim 1.

5. Poly(methyl-beta-styryl acrylate) according to claim 1.

6. Poly(methyl-beta-vinylacrylate) according to claim 1.

7. A process for polymerizing an optically inactive unsaturated monomer containing no asymmetric carbon atom and selected from the group consisting of benzo furane, methylsorbate, butylsorbate, butyl-beta-styryl acrylate, methyl-beta-styryl acrylate, methyl-beta-vinylacrylate and transpentadiene, to a linear, optically active homopolymer having asymmetric carbon atoms only in the main chain and formed by opening the π-bond of the monomer during the polymerization, which process comprises polymerizing the monomer in contact with a catalyst selected from the group consisting of (S) isoamyl lithium
menthyl lithium
tris(S)-isoamyl aluminum etherate
a complex of butyl lithium with (−) menthyl ethyl ether
a complex of ethyl aluminum dichloride with beta-phenylalanine
a complex of aluminum tribromide with beta-phenylalanine
a complex of ethyl aluminum dichloride with tetramethyl ammonium camphorsulfonate
a complex of ethyl aluminum dichloride with camphorsulfonic acid
a complex of ethyl aluminum dichloride with (−) brucine
a complex of ethyl aluminum dichloride with (−) methyl butyl benzylphenyl ammonium iodide, and
a complex of boron fluoride ethyl etherate with (−) menthyl ethyl ether.

8. The process according to claim 7, characterized in that the catalyst is (S) isoamyl lithium.

9. The process according to claim 7, characterized in that the catalyst is menthyl lithium.

10. The process according to claim 7, characterized in that the catalyst is tris-(S)-isoamyl aluminum etherate.

11. The process according to claim 7, characterized in that the catalyst is a complex of boron fluoride with menthyl ethyl ether.

12. The process according to claim 7, characterized in that the catalyst is a complex of ethyl aluminum dichloride with (—) methyl butyl benzyl phenyl ammonium iodide.

13. A polymerization catalyst prepared by mixing an aluminum compound selected from the group consisting of ethyl aluminum dichloride and aluminum tribromide with an optically active substance selected from the group consisting of beta-phenylalanine, brucine, camphorsulfonic acid and tetramethyl ammonium camphorsulfonate.

References Cited by the Examiner

Bulletin, Soc. Chim. France, 1959, pp. 64–71.

Marvel et al.: "Optically Active Polymers From Active Vinyl Esters," JACS, December 1940, pages 3499–3504, vol. 62.

Schmitt et al.: "The Ionic Polymerization of Cyclic Olefins Using Optically Active Gegen Ions," Journal of Polymer Science, vol. 49, pages 287–296 (1961).

JOSEPH L. SCHOFER, *Primary Examiner.*

JOSEPH R. LIBERMAN, *Examiner.*

L. WOLF, *Assistant Examiner.*